Dec. 14, 1965    R. S. WEBB    3,223,946
WIDE RANGE MULTIVIBRATOR CIRCUIT
Filed May 26, 1961    2 Sheets-Sheet 1

INVENTOR.
Robert S. Webb,
BY
M. K. Murphy
ATTORNEY.

Dec. 14, 1965   R. S. WEBB   3,223,946
WIDE RANGE MULTIVIBRATOR CIRCUIT
Filed May 26, 1961   2 Sheets-Sheet 2

INVENTORS.
Robert S. Webb,
BY
M R Murphy
ATTORNEY.

United States Patent Office 3,223,946
Patented Dec. 14, 1965

3,223,946
WIDE RANGE MULTIVIBRATOR CIRCUIT
Robert S. Webb, 5169 Dianna Drive,
Bloomfield Hills, Mich.
Filed May 26, 1961, Ser. No. 112,891
4 Claims. (Cl. 331—144)

This invention relates to electrical discharge machining particularly to improved machining power circuits therefor.

Electrical discharge machining, sometimes referred to in the art as EDM, spark machining, or arc machining, is carried on by passing a series of discrete, localized extremely high current density discharges across a gap between a conductive tool electrode and workpiece at sonic or ultrasonic frequencies in the presence of a dielectric fluid for eroding the workpiece.

In electrical discharge machining the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

Numerous improvements in the art of electrical discharge machining have caused it to advance from the stage of a laboratory curiosity to a highly productive machine tool widely used today in the tool room and production line.

Advanced electrical discharge machining power circuitry utilizes electronic switches such as vacuum tubes for minutely and accurately controlling the discrete discharges across the machining gap.

This disclosure contains reference to transistors or vacuum tubes or other "electronic switches." It follows that with proper redesign of the circuit any "electronic switch" may be substituted. By "electronic switch" is meant any electronic control device having three or more terminals consisting of at least two terminals acting as a switch in the power circuit, the conductivity between said power terminals being controlled by a control element within the switch responsive to drive from an external control circuit whereby the conductivity of the power circuit is controlled statically or electrically without movement of mechanical elements within the switch.

An example of the type of machining power circuit representative of the present state of the art is shown in Matulaitus and Lobur Patent No. 2,951,969, issued September 6, 1960. A machining power circuit such as disclosed therein, when combined with a power feed of an improved type as shown in Webb Patent No. 2,962,630, issued November 29, 1960, results in a machine having excellent control characteristics and readily usable by machinists having mechanical skill only and no electrical or electronics background as is typical of the machining trades.

The above machining power circuit contemplates a fixed multivibrator cycle for producing a definite ON-time and OFF-time at a particular machining tape. I have found that it is desirable to be able to vary continuously the machine ON-time while maintaining a substantially constant frequency or repetition rate. A machine having these characteristics has infinitesimally adjustable machining current or machining rate thereby permitting exact adjustment to maximum efficiency machining conditions at a particular desired metal removal rate and surface finish or machining gap.

A further objection to the circuitry of Patent No. 2,951,969 is that a machining power circuit capable of extremely high current output required for high metal removal rate necessitates the use of many, sometimes thousands, of vacuum tubes to produce the desired machining current. Since vacuum tubes are inherently high voltage devices extremely high power losses result at these machining currents and expensive equipment and complex electronic circuitry is required. The cost of operation and consumption of electric power is correspondingly high. Furthermore vacuum tubes are thermionic emissive devices and their average or rated life is approximately 1000 hours. With this limited life it can be seen that as the number of vacuum tubes increases, the cost of the basic machine as well as operation and maintenance becomes excessive.

Accordingly it is the principal object of this invention to provide an improved machining power circuit having an adjustable ON–OFF ratio or duty factor infinitesimally adjustable throughout the machining current range at various selected discharge repetition rates.

Another object of this invention is to provide improved forms of semiconductor circuitry having greatly increased operating life as is characteristic of semiconductors.

Another object of this invention is to provide relatively high current, low voltage power circuitry more nearly matched to the characteristics of the machining gap thereby eliminating the excessive power dissipation characteristic of vacuum tube electric discharge machining circuitry.

Other objects and advantages are disclosed in the following specification, which taken in conjunction with accompanying drawings shown preferred forms of practicing the invention.

In the drawings in which reference numerals have been used to designate like parts herein referred to:

Figure 1:
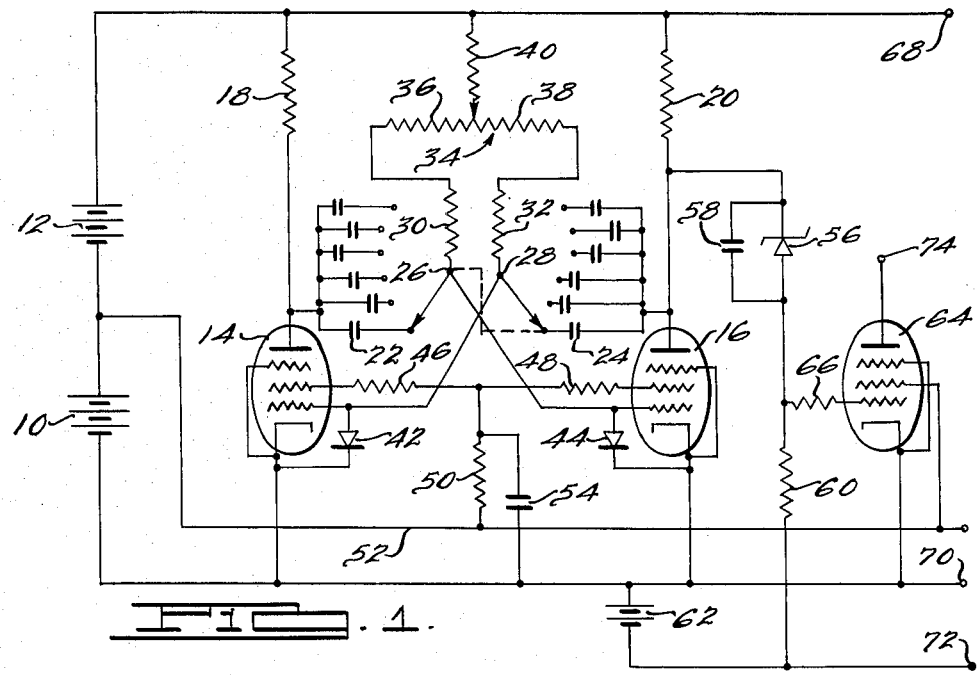
FIG. 1 shows a multivibrator circuit employing vacuum tubes having a continuously adjustable ON–OFF ratio at several different pulse repetition rates.

Referring now to FIG. 1, multivibrator plate supply voltages 10 and 12 furnish power to the multivibrator circuit containing multivibrator pentode vacuum tubes 14 and 16. The cathode of multivibrator tube 14 is connected to the negative terminal of supply 10 and the anode of tube 14 is connected through plate load resistor 18 to the positive terminal of supply 12 which is connected in series with supply 10. Multivibrator tube 16 is similarly connected through plate load resistor 20 to the positive terminal of plate supply 12. A typical cross coupling capacitor 22 is connected to the anode of tube 14 and a similar coupling capacitor 24 is connected to the anode of tube 16. The opposite sides of the respective coupling capacitors are connected to the opposing control grids through selector switches 26 and 28 and operate in conjunction with resistors 30 and 32 and rheostat 34 to determine the operating time constant of the multivibrator circuit. Rheostat 34 has portion 36 connected in the control grid circuit of tube 16 and portion 38 connected in the control grid circuit of tube 14. The adjustable arm of rheostat 34 is connected through resistor 40 to the positive terminal of supply 12 to complete the grid return circuit to the maximum positive voltage.

A diode 42 connects between the cathode and grid of tube 14 with its cathode connected to the cathode of tube 14 and its anode connected to the control grid of tube 14 and diode 44 is similarly connected to tube 16. Screen current limiting resistors 46 and 48 connect the respective screen grids to a common terminal on dropping resistor 50. The opposite end of resistor 50 is connected to screen grid tap 52 on the main plate supply and resistor 50 in conjunction with capacitor 54 provides a filtered screen voltage tap for the multivibrator.

The output of the multivibrator is taken from the anode of tube 16 and connects through reference diode 56 and storage capacitor 58 to the control grid circuit of the first stage of amplification. Resistor 60 connects to bias supply 62 to provide OFF bias for amplifier tube 64 during conduction of multivibrator tube 16. Grid current limiting resistor 66 connects the control grid of tube 64 to the common terminal between the negative side of reference diode 56 and the positive terminal of bias return resistor 60. D.-C. output terminals 68 and 70 provide power for additional stages of amplification or for the machining gap circuit itself which is omitted in this example and may correspond to the power circuit of Patent No. 2,951,969.

Bias terminal 72 may provide bias for the output tube bank or additional stages of amplification. The anode of pentode 64 connects to terminal 74 which is the signal output of this multivibrator and first stage of amplification. Depending on the operating power level, this network may connect directly to the machining gap as shown in the above mentioned patent, or may employ additional stages of amplification prior to connection to the output tube bank.

The important portion of this circuitry is the network connecting the control grids of the multivibrator to the positive terminal of plate supply 12. The usual return for multivibrator control grids would be for resistor 40 to return to the cathodes of the multivibrator or the negative terminal of supply 10 rather than the positive terminal of supply 12 as is shown in this circuit. By returning this resistor to the most positive terminal, stable operating characteristics are insured since the multivibrator tubes pass through the cut-off region much more rapidly when connected to the positive terminal as shown rather than the conventional cathode return. The resistance of limiting resistors 30 and 32 and of rheostat 34 must be correspondingly higher to limit grid current and provide the same operating frequency as a cathode return circuit.

The important grid return connection of this network is that the adjustable tap of rheostat 34 returns the control grid circuits to the fixed positive voltage. As the adjustable tap is moved to the right, increasing resistance 36, it automatically decreases the resistance 38 in the opposing grid circuit. It is well known in multivibrator design that the operating period of a multivibrator may be represented by the formula:

$$t = K[C22(R30+R36) + C24(R32+R38)]$$

If coupling capacitors 22 and 24 are equal the formula may be simplified to:

$$t = K_1(R30+R32+R34)$$

From this simplified formula it can be seen that as the tap on rheostat 34 is moved from one extreme to the other, resistance is similarly moved from one grid return to the opposing grid return thereby maintaining a constant frequency regardless of the position of the adjustable tap on the rheostat. Adjustment of the rheostat in this manner of course increases the ON-time and decreases the OFF-time while maintaining a constant repetition rate and provides infinitesimal adjustment of duty factor and therefore machining current at any particular selection of repetition rate.

Switches 26 and 28 are ganged together and are switched to select a different repetition rate. Diodes 42 and 44 are provided to shunt the charging currents of capacitors 22 and 24 from the tube control grids thereby protecting tubes 14 and 16 and insuring rectangular and fixed amplitude output signal from these tubes.

In this example six different capacitors are shown in each grid circuit to provide six different frequencies. If these diodes have a higher operating current than the maximum rated control grid current of the multivibrator tubes, the range of operation of this circuit may be extended materially. By including these diodes in the circuitry, resistor 40 connected to the common potentiometer arm, may be replaced by a direct connection thereby making the effective grid resistance at either extreme of rheostat 34 equal to resistor 30 or 32. In the absence of diodes 42 and 44 common return resistor 40 becomes essential to extend the constant frequency range of the multivibrator since the lower tube voltage drop at the extreme ends of rheostat 34, caused by excess grid current, is compensated by the resulting lower common return, caused by resistor 40, thereby readjusting operating frequency.

By including diodes 42 and 44 this compensation is unnecessary and the constant frequency range is extended substantially from a range of duty factor without the diodes but including common return resistor 40 of approximately 10% to 90% duty factor for a substantially constant frequency to a duty factor range with diodes 42 and 44 to less than 1% to more than 99%. The only limit for minimum ON-time is then the time constant of resistor 20, capacitor 24, connecting to diode 42 in the grid circuit of tube 14 in comparison to the time constant of capacitor 24, resistor 32, and full rheostat resistance 36 and 38. In each case in order to maintain the constant repetition rate or frequency of operation it is necessary that the screen grid voltage of the respective tubes and the plate supply voltage each be maintained substantially constant. If the additional load on the supply furnished by the control grid circuits in one extreme position or the other is negligible compared to the constant amplitude of power resulting from conduction of tube 14 through plate load resistor 18 or tube 16 through plate load resistor 20, regulation of supplies 10 and 12 is unnecessary. If additional load is placed on these supplies varying with ON-OFF ratio at terminals 68 and 70, it is necessary to regulate the total supply voltage between these two terminals or at least a portion of the voltage presented to the common positive return of the multivibrator circuit.

The output coupling circuit of this wide range multivibrator is equally important because a simple coupling capacitor cannot be employed. In order to include capacitive coupling to succeeding stages of the amplifier, such as coupling capacitor 56 in the above mentioned patent, it is necessary to confine the variation in ON-OFF ratio to rather narrow limits.

In the above patent it is essential that tube 16 conduct for 10 to 20 percent of the total cycle time in order to transfer sufficient power through capacitor 58 and diode 56 in order to drive the control grid circuit of that power amplifier.

Effective wide range coupling is achieved in FIG. 1 through use of reference diode 56 and capacitor 58. Reference diode 56 is a D.-C. voltage regulating device and maintains a substantially constant voltage regardless of the current flow through the device. A coupling capacitor, on the other hand, is an A.-C. device in which equal current must be passed in each direction. In the circuit of FIG. 1, capacitor 58 serves to pass the high frequency transients of this circuit and reference diode 56 maintains a substantially constant D.-C. voltage across capacitor 58 thereby forming a reference voltage at this point. Reference diode 56 and capacitor 58 form a floating D.-C. reference voltage of extremely low shunt or leakage capacity. If a transformer and rectifier network were employed at this point and the necessarily large filter capacitor that would be required to produce a constant D.C. voltage were used, the shunt or leakage capacity between this network, which is floating on the anode of tube 16 and leads 68 or 70, would result in excessive losses by conducting shunt capacitive currents to these capacitively coupled points. This network is small and of low mutual capacitance and therefore results in extremely low losses.

A typical value for plate supply voltage between terminals 68 and 70 is approximately 250 volts. The drop across multivibrator tubes 14 and 16 is typically approximately 100 volts during conduction thereby generating a signal of approximately 150 volts across the plate load resistors. In this example reference diode 56 would be chosen to have a voltage regulation level of approximately 200 volts.

As tube 16 becomes conductive generating the voltage across load resistor 20 of approximately 150 volts the negative terminal of capacitor 58 is carried downward from terminal 68 by an additional 150 volts in addition to the 200 volt reference voltage. This generates a negative bias voltage across resistor 60 and biases the control grid of tube 64 to minus 100 volts at this time and maintains it nonconductive during periods of conduction of tube 16.

During periods when tube 16 is rendered nonconductive by the multivibrator action, no drop occurs across load resistor 20 from tube 16 and the positive terminal of capacitor 58 is effectively connected to the positive terminal of supply 12. The negative terminal of capacitor 58 is at this instant approximately 50 volts positive with respect to the cathode of tube 64. Tube 64 is rendered conductive and electron flow from the cathode to the grid of tube 64 develops approximately 50 volts across resistor 66 at this time thus completing one complete cycle of operation.

The output terminals of this multivibrator and first stage of amplification are connected as outlined above to succeeding stages of amplification or to the working gap itself depending on the magnitude output power required.

Figure 2:
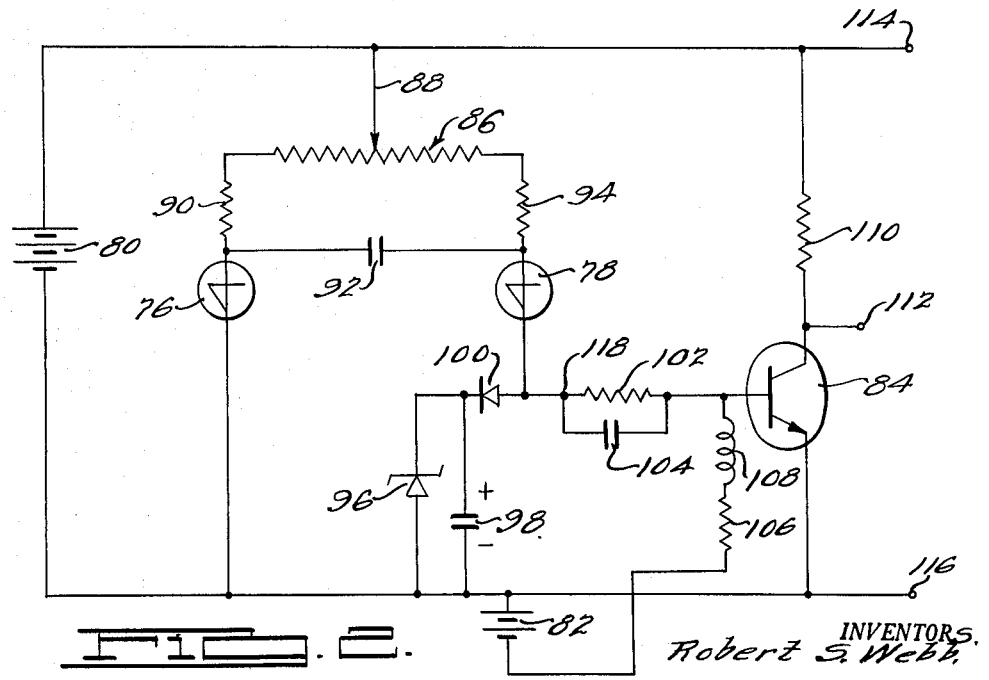
FIG. 2 shows a circuit having similar operating characteristics employing four layer avalanche diodes in place of vacuum tubes as the stable switches and a transistor amplifier in place of corresponding stages of vacuum tube amplification.

FIG. 2 is also a wide range astable multivibrator circuit employing four layer avalanche diodes 76 and 78 in place of multivibrator tubes 14 and 16. Anode supply voltage 80 and bias supply voltage 82 furnish D.-C. power to the multivibrator circuit and a similar first stage of amplification is shown in the form of NPN transistor 84. Avalanche diodes 76 and 78 are commercially obtainable devices available in the electronics industry and their operation as a multivibrator is known. The invention in this circuit consists essentially of rheostat 86 and the novel return of control arm 88 to the positive terminal of supply 80. Current limiting resistor 90 is connected to the anode of avalanche diode 76 to provide the minimum time constant in conjunction with capacitor 92 when reference arm 88 is in the extreme left hand position. Limiting resistor 94 is connected in the anode circuit of avalanche diode 78 and operates similarly as reference arm 88 is in the extreme right hand position.

The signal output of this circuit is developed in the cathode circuit of avalanche diode 78 and consists of a signal clipping reference circuit comprised of reference diode 96 and storage capacitor 98 having their negative terminals connected to the negative terminal of supply 80. The positive output of this reference network is connected through diode 100 to the cathode of avalanche diodes 78. The junction of the anode of diode 100 and the cathode of avalanche diode 78 connects to signal resistor 102 having lead capacitor 104 connected in parallel therewith. Transistor bias resistor 106 connects to the negative terminal of bias supply 82. The opposite end of resistor 106 is connected through choke 108 to the common junction between network 102, 104 and the base of transistor 84. Rectangular output signal of transistor 84 is developed across collector resistor 110 and forms at terminal 112 the output signal of this multivibrator and amplifier between output terminals 112, 114, and 116.

The astable multivibrator signal of this circuit is developed by the oscillation produced by avalanche diodes 76 and 78. As an example assume avalanche diode 76 to be conductive from the negative terminal of supply 80 through diode 76, resistor 90, and the left hand portion of rheostat 86. Capacitor 92 is charged through resistor 94 and the right hand portion of rheostat 86 with little voltage drop occurring across avalanche diode 76 during this period of conduction. As capacitor 92 becomes charged to the breakdown level of avalanche diode 78, avalanche conduction occurs through this diode instantaneously causing the voltage across diode 78 to fall to a very low value in the order of 1 to 2 volts. At the instant of breakdown of diode 78, the left hand terminal of capacitor 92 is charged negatively with respect to the right hand terminal. This negative voltage instantly extinguishes avalanche diode 76 causing it to assume a blocked condition. Diode 78 continues to conduct through resistor 94 and the right hand portion of rheostat 86 and the negative voltage of capacitor 92 discharges through resistor 90 and the left hand portion of rheostat 86. Capacitor 92 then charges in opposite polarity assuming a negative voltage on its right hand side. As capacitor 92 in conjunction with the steady state D.-C. drop across network 96, 98, 100 reaches the breakdown voltage of diode 76, the cycle reverses. This astable condition continues at an operating frequency determined by capacitor 92 in conjunction with resistors 90, 94 and rheostat 86. As explained in FIG. 1, the total operating time constant of this network remains unchanged regardless of the position of rheostat arm 88 and a constant repetition rate is maintained regardless of the ON-OFF ratio or duty factor.

As rheostat arm 88 is moved to the extreme left, diode 78 conducts for a brief interval and diode 76 conducts for substantially all of the cycle. As rheostat arm 88 is moved to the right the opposite condition results in which diode 78 conducts for substantially all of the cycle.

Reference network 96, 98, 100 clips the output signal of diode 78 to a constant magnitude and develops at terminal 118 a fixed amplitude positive voltage signal during conduction of diode 78. This positive voltage signal draws electron flow from the negative terminal of supply 80 through the emitter-base circuit of transistor 84, resistor 102, and lead capacitor 104 to terminal 118 where it is conducted through avalanche diode 78.

After a brief delay interval on initiation of this signal a shunt electron flow occurs from the negative terminal of supply 82 through resistor 106 and choke 108.

As avalanche diode 78 blocks, choke 108, which is of relatively short time constant, sustains electron flow through the base-emitter circuit of transistor 84, bias supply 82, and resistor 106 sharply biasing transistor 84 nonconductive. As avalanche diode 78 continues in its blocked condition, bias 82 maintains transistor 84 nonconductive.

Network 96, 98, 100 is provided primarily to limit the drive current of transistor 84 to a value slightly below saturation drive to minimize storage time occurring in transistor 84. This network may be eliminated and transistor 84 may be over driven if storage time in transistor 84 is not objectionable. Operation in this method results in a longer signal duration across resistor 110 than would be encountered through proper design of network 96, 98, 100. In either case, a substantially rectangular voltage signal is developed across resistor 110 and produces at output terminals 112, 114 rectangular pulsating drive signal for successive stages of amplification or for the output network itself.

Figure 3:
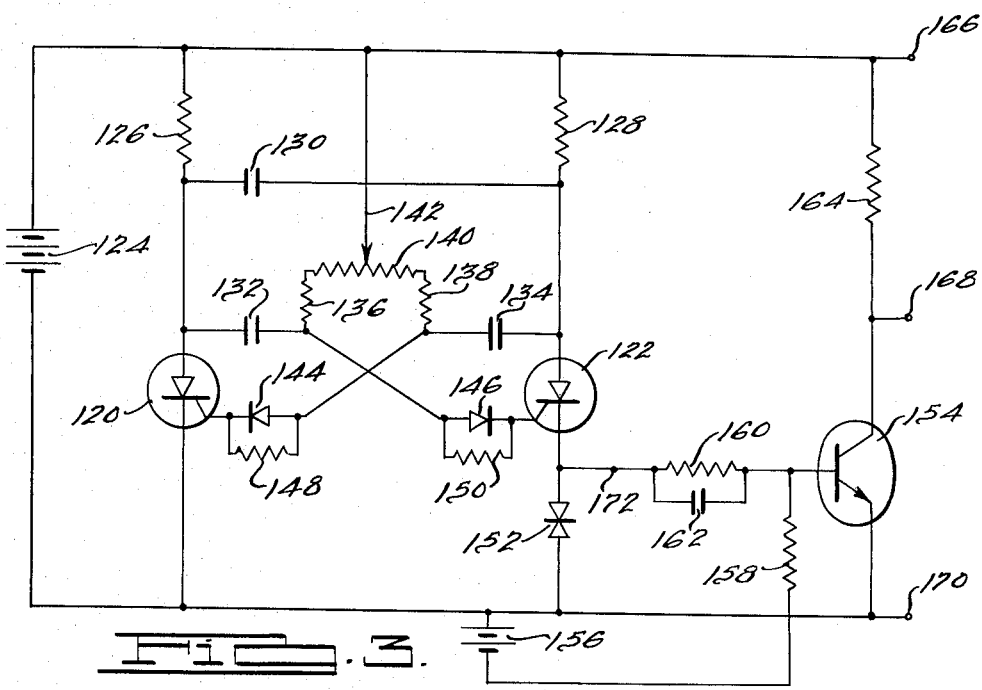
FIG. 3 is somewhat similar to FIG. 2 except that controlled rectifiers are employed as the multivibrator switching devices.

FIG. 3 is a circuit somewhat similar to FIG. 2 having controlled rectifiers as the multivibrator switches. Controlled rectifiers are four layer solid state devices and are similar in many respects to an avalanche diode except that the devices are triggered into conduction by a forward gate signal rather than a voltage breakdown condition. Controlled rectifiers 120 and 122 utilize power from anode supply voltage 124 to develop the astable multivibrator signal. Plate load resistor 126 is connected in the anode circuit of controlled rectifier 120 and load resistor 128 is connected in the anode circuit of rectifier 122. Cross coupling capacitor 130 directly connects between the two anodes of the controlled rectifiers and may be compared to capacitor 92 of FIG. 2.

The time constant of the circuit is developed by cross coupling capacitors 132 and 134 which connect the anodes of the controlled rectifiers to the opposing gate circuits. Capacitors 132 and 134 operate in conjunction with limiting resistors 136 and 138 and rheostat 140 to control the total circuit time constant or repetition rate. Operation of rheostat 140 is similar in principle to rheostats 34 and 86 of FIGS. 1 and 2 and forms the basis for the constant repetition rate with varying ON-OFF ratio. As in the above circuits control arm 142 connects to the positive terminal of anode supply 124.

Forward gate signal for controlled rectifier 120 is conducted through diode 144 and forward gate signal for controlled rectifier 122 is conducted through diode 146 to insure sharp triggering of the devices. Resistors 148 and 150 are provided in parallel with diodes 144 and 146 respectively to provide high impedance reverse bias during the OFF period of each device.

The output signal circuit of FIG. 3 is somewhat similar to FIG. 2 and employs double anode reference diode 152 connected in the cathode circuit of controlled rectifier 122 to produce a rectangular controlled amplitude pulse to the base circuit of transistor 154. The conduction voltage of the diode 152 is generally higher than that of bias 156 and conduction drive to transistor 154 occurs through resistor 158 connecting the negative terminal of bias 156 to the base of transistor 154 and through limiting resistor 160 and lead capacitor 162. Output signal of transistor 154 is developed across load resistor 164 and output signal is connected to succeeding stages of amplification by terminals 166 and 168 which in conjunction with reference terminal 170 provides the output of this network consisting of a multivibrator and first stage of amplification.

In order to review operation of the circuit let it be assumed that controlled rectifier 120 is conductive thereby developing substantially the full voltage of supply 124 across load resistor 126. After the brief discharge interval of capacitor 130 through opposing load resistor 128, capacitor 130 is also charged in this polarity being negative on the left side and positive on the right side. Opposite controlled rectifier 122 is maintained nonconductive for the duration of the discharge of capacitor 132 through resistor 136 and the left hand portion of rheostat 140.

As capacitor 132 discharges sufficiently, the gate of controlled rectifier 122 is rendered slightly positive through diode 146 and this controlled rectifier is triggered into conduction. Triggering of controlled rectifier 122 instantaneously connects the opposite voltage of capacitor 130 across the anode circuit of controlled rectifier 120 thereby causing it to deionize.

At the instant of firing of controlled rectifier 122 substantially the full voltage of supply 124 existed across capacitor 134 and as controlled rectifier 122 fires, this voltage stored on capacitor 134 renders the gate of controlled rectifier 120 negative, blocking diode 144 and causing a minute leakage bias current to flow through resistor 148. Resistors 148 and 150 are of high relative resistance to the other circuit resistors and provide sufficient reverse leakage current to maintain each rectifier biased OFF during its nonconductive period and yet limit reverse current in the gate circuit within the rated limit of the device.

The time constant of capacitor 130 and resistor 126 or 128 is just sufficient to permit recovery of the respective anode circuit after firing of the opposite anode. The minimum time constant of conduction for controlled rectifier 120 is formed by capacitor 132 and resistor 136 with control arm 142 of rheostat 140 in the extreme left hand position. The minimum time constant of conduction of rectifier 122 is formed in a similar manner by capacitor 134 and resistor 138 when control arm 142 is in the extreme right hand position. As in the above circuits the position of control arm 142 determines the relative ON-OFF ratio or duty factor while maintaining the repetition rate substantially constant.

The output signal circuit of FIG. 3 is quite similar to that of FIG. 2 in which a constant amplitude drive pulse occurs at point 172 during conduction of rectifier 122. The amplitude of this drive pulse is controlled by double anode rectifier 152 and is independent of the conduction current of controlled rectifier 122. The minimum conduction current of controlled rectifier 122 must of course be sufficient to completely drive NPN transistor 154.

During conduction of controlled rectifier 122, drive current for transistor 154 occurs from the negative terminal of supply 124 through the emitter-base circuit of transistor 154, resistor 160, capacitor 162, terminal 172, through the conduction circuit of rectifier 122. A shunt current also occurs from the negative terminal of bias supply 156 through resistor 158 and network 160, 162. Excess drive current conducts through double anode diode 152.

The conduction voltage of double anode diode 152 is generally larger than bias supply 156 to prevent a loss of current from bias 156 during the normal OFF time. Turn OFF of transistor 154 is achieved from the negative terminal of bias 156 through resistor 158 and the base-emitter circuit of transistor 154 to the positive terminal of bias 156. Output signal is developed across load resistor 164 and is conneced to succeeding stages of amplification through terminals 166, 168 and 170 in a manner analogous to terminals 114, 112 and 116 of the circuit of FIG. 2. It is believed apparent that the drive networks of FIG. 2 or 3 are interchangeable and either may be employed in each circuit. In FIG. 2 the minimum time constant of recovery can be much smaller thereby permitting a higher repetition rate and diode 100 may be a fast recovery diode having higher frequency characteristics than either reference diode 96 of FIG. 2 or double anode diode 152 of FIG. 3. With present day controlled rectifiers the recovery time constant is generally in the order of 10 microseconds requiring that the maximum limits be at least that, thereby limiting the maximum possible frequency to 50 kc. with no variation in ON-OFF ratio or to lower frequency with some variation in ON-OFF ratio. With present day devices, operation of the circuit of FIG. 2 can occur with minimum ON times in the order of a fraction of a microsecond thus permitting much higher frequency response and a broader range of operation.

Figure 4:
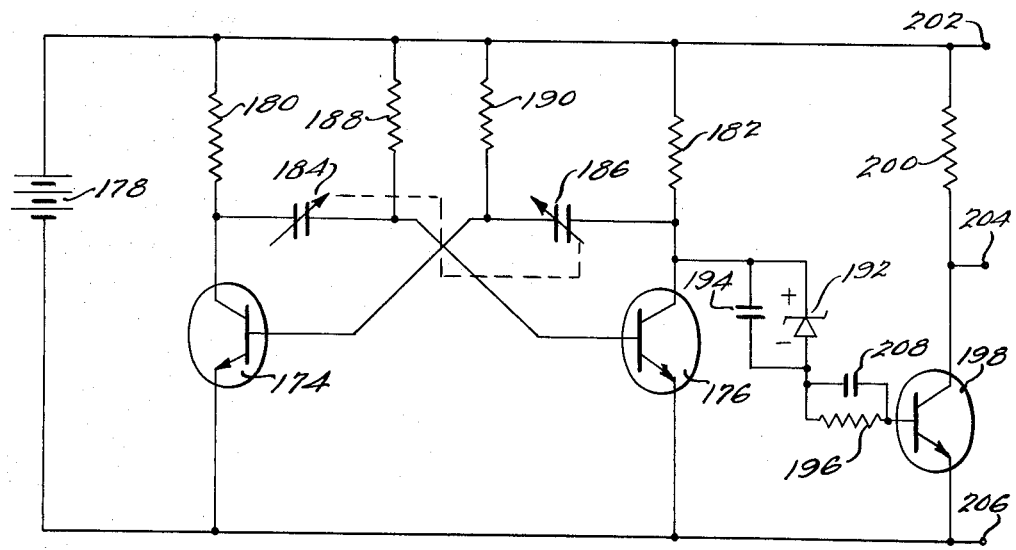
FIG. 4 shows a modified form of circuitry employing transistors as the electronic switches in the multivibrator circuit and including capacitive means for infinitesimal adjustment of duty factor.

FIG. 4 shows a transistorized wide range multivibrator circuit utilizing a ganged variable capacitor network to achieve constant frequency wide range ON-OFF ratio employing transistors as the multivibrator element. Transistors 174 and 176 utilize power from supply voltage 178 and develop signal across resistors 180 and 182 connected respectively in the collector circuits of transistors 174 and 176. Variable capacitors 184 and 186 are ganged together and oppositely phased and operate in conjunction with base resistors 188 and 190 to form the operating time constant of the circuit.

The signal output network of FIG. 4 is somewhat similar to FIG. 1 and employs reference diode 192 and capacitor 194 to form a floating D.-C. network connected to the collector of transistor 176. Drive limiting resistor 196 is connected between the negative end of network 192, 194 and the base of transistor 198. Transistor 198 amplifies the rectangular drive signal presented to its base-emitter circuit and produces an amplified power signal across load resistor 200. Output signal of this circuit is taken from terminals 202, 204, and 206 as in FIGS. 1, 2, and 3 and is connnected to succeeding stages of amplification.

It is important in a transistor circuit of this type that the transistors not be excessively saturated by drive current. Accordingly it is necessary to provide fixed resistors 188 and 190 to provide sufficient drive current to operate transistors 174 and 176 at or near saturation without over driving the respective transistors. For this reason the adjustable ON-OFF ratio is achieved through ganged capacitors 184 and 186. Most transistor circuitry is of relative low voltage, low impedance and these capacitors may be formed of the adjustable ceramic disc type developed especially for transistor circuitry requiring larger values of capacity for the lower resistance values typical of transistor circuitry.

Assuming transistor 174 to be conductive drive current is furnished from the negative terminal of supply 178 through the emitter-base junction of transistor 174, resistor 190 to the positive terminal of supply 178. Transistor 176 is maintained OFF for the duration of the time constant of capacitor 184 and resistor 188. As capacitor 184 discharges and the base of transistor 176 becomes slightly positive, electron flow occurs from the negative terminal of supply 178 through the base-emitter junction of transistor 176 and resistor 188 producing an amplified output electron flow through resistor 182. As in the circuit of FIG. 1, this action becomes regenerative thereby sharply biasing transistor 174 nonconductive and rendering transistor 176 sharply conductive by regenerative multivibrator action.

Capacitors 184 and 186 are of identical maximum size and resistors 188 and 190 are of equal resistance. As capacitor 184 is increased in capacitance, ganged capacitor 186 is decreased by a like amount thereby varying the ON-OFF ratio while maintaining a constant repetition rate in a manner analogous to that of FIG. 1. If it is desired to change the basic repetition rate, ganged capacitors 184 and 186 are switched in a manner analogous to capacitors 22 and 24 of FIG. 1. In order to preserve the operating characteristics of this circuit, capacitors 184 and 186 must be of equal maximum value and as one is adjusted to its maximum value, the other is adjusted to its minimum value regardless of total capacitance.

The voltage balance between supply 178, reference diode 192, and signal resistor 182 is somewhat analogous to the output circuitry of FIG. 1. For equal drive and bias voltages, reference diode 192 is chosen to have a regulation voltage approximately one-half of supply 178. During conduction almost no voltage drop occurs across transistor 176 effectively connecting the collector to the negative terminal of supply 178. During this interval of conduction of transistor 176, the base of transistor 198 is biased negative by the voltage of reference 192. Lead capacitor 208 is connected across resistor 196 to provide a sharp turn-OFF current at the instant of turn-OFF and accelerated turn-ON of transistor 198. During the OFF periods of transistor 198, the base-emitter circuit of this transistor blocks conduction, permitting discharge of capacitor 208. As transistor 176 is rendered sharply nonconductive, lead capacitor 208 is connected to the positive terminal of supply 178 through plate load resistor 182, which is of lower resistance than limiting resistor 196. For the minute time constant of capacitor 208, resistor 182, turn-ON of transistor 198 is sharply accelerated, thereby producing a sharp rectangular output pulse across load resistor 200 connected in the collector circuit of transistor 198. A similar accelerating capacitor may be employed in the grid circuit of tube 64 of FIG. 1 if desired.

Drive current to transistor 198 occurs during OFF time of transistor 176 and conducts from the negative terminal of supply 178 through the emitter-base junction of transistor 198, resistor 196, reference network 192, 194, resistor 182 to the positive terminal of supply 178. The load of this drive current on the multivibrator is minimized since resistor 196 is of higher impedance than resistor 182, thereby producing the major portion of the voltage drop across resistor 196.

Each of the above four circuits operates throughout wide ranges of duty factor or ON-OFF ratio while maintaining a substantially constant repetition rate or frequency. As outlined above this operation is important in a modern day electrical discharge machining power circuit but may be utilized in any electronic multivibrator circuit requiring a widely adjustable ON-OFF ratio at a substantially constant frequency.

In the above drawings, the D.-C. supplies are shown as batteries in the interest of simplifying the disclosure. In actual practice, these sources of D.-C. are derived from the secondary of a transformer having its primary connected to the power source for the machine which may be single phase or polyphase A.-C. The secondary voltage is rectified and stored, usually in an electrolytic storage capacitor to form a nearly ideal D.-C. source having very low internal impedance.

Thus it may be seen that I have shown and described several novel astable multivibrator circuits and a unique method of producing a widely adjustable ON-OFF ratio while maintaining a substantially constant frequency and several examples of apparatus constructed in accordance with the teachings of this invention and employing several different types of electronic switches as multivibrator elements. By so doing it is not intended to limit the invention to the above disclosure but only as set forth in the following claims.

I claim:

1. An astable multivibrator circuit for providing wide range ON-OFF ratio operation comprising a pair of electron switches interconnected for alternate conduction, each of said switches having a control element, an input and an output power terminal, an adjustable resistance capacitance network operatively connected to said switches for determining their relative conductive times, and at least one shunt charging diode connected between the input terminal and control element of one of said switches and connected with like polarity to said input terminal and said control element and phased to provide an electron flow in the conductive state of its associated switch.

2. The combination as set forth in claim 1 in which said diode is of a substantially higher current rating than said control element for extending the range of operation of said switches to provide a duty factor range from approximately one percent.

3. An astable multivibrator circuit for providing wide range ON-OFF ratio operation comprising a pair of electron tubes interconnected for alternate operation, each of said tubes having a control grid, cathode, and plate, each of said electron tubes having its control grid operatively connected to the plate of the other and its plate operatively connected to the control grid of the other for alternate operation, and at least one shunt charging diode having its cathode connected to the cathode and its anode connected to the control grid of one of said tubes said diode being rendered conductive in the conductive state of its associated tube.

4. A wide range pulse forming network comprising two oppositely phased electronic switches interconnected for alternate operation, each of said switches having a control element, an input terminal and an output terminal, an adjustable resistance capacitance network operatively connected to said switches for determining their relative conduction time, at least one shunt charging diode connected between the input terminal and the control element of one of said switches and connected with like polarity to said input terminal and said control element and phased to provide an electron flow in the conductive state of its associated switch, at least one electronic amplifier stage, and a coupling network operatively connected in the input to said amplifier stage from one of said switches, said coupling network comprising a parallel-connected reference diode and capacitor.

References Cited by the Examiner

UNITED STATES PATENTS

| | | | |
|---|---|---|---|
| 2,025,911 | 12/1935 | Stansbury | 331—144 |
| 2,282,895 | 5/1942 | Shepard | 331—144 |
| 2,514,023 | 7/1950 | Bergfors | 331—144 |
| 2,787,712 | 4/1957 | Priebe et al. | 331—113 |
| 2,900,606 | 8/1959 | Faulkner | 331—113 |
| 2,990,478 | 6/1961 | Scarbrough | 307—88.5 |
| 2,997,604 | 8/1961 | Shockley | 331—107 |
| 3,001,144 | 9/1961 | Dandl | 330—19 |
| 3,040,270 | 6/1962 | Gutzmiller | 331—113 |
| 3,056,046 | 9/1962 | Morgan | 307—88.5 |

OTHER REFERENCES

Shea: Principles of Transistor Circuits, page 51, New York, John Wiley & Sons, Inc., 1953.

ROY LAKE, *Primary Examiner.*